United States Patent Office  3,140,992
Patented July 14, 1964

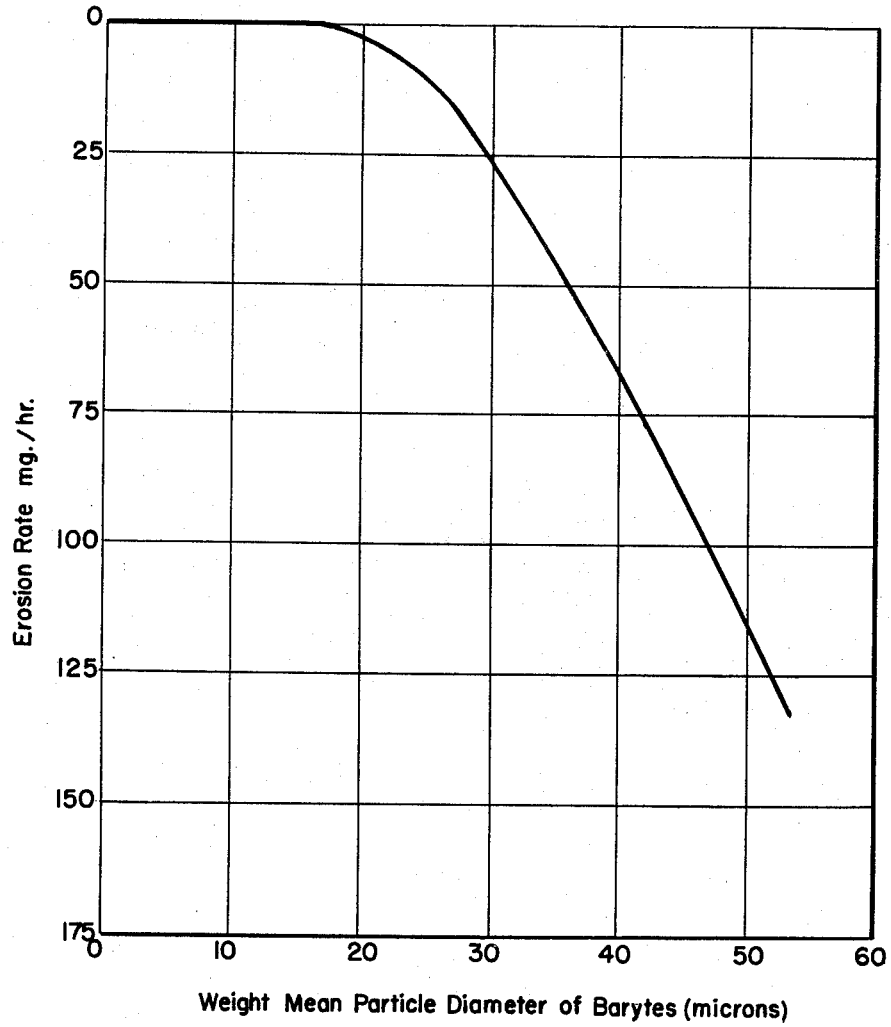

3,140,992
EROSION REDUCTION
Robert H. Cramer, Woodbury, Robert D. Drew, Wenonah, and Howard W. Shea, Woodbury, N.J., assignors to Socony Mobil Oil Company, Inc., a corporation of New York
Filed Dec. 20, 1961, Ser. No. 160,810
9 Claims. (Cl. 208—120)

This invention relates to a method for reducing erosion in a process exemplified by catalytic conversion and separation processes utilizing refractory particles in the form of a moving bed. More particularly, the present invention is directed to the reduction of erosion in a unit wherein a continuously moving bed of siliceous particulate solid is employed.

The method described herein is applicable to a wide variety of processes utilizing moving streams or beds of particulate contact material, including conversion processes such as desulfurization, isomerization, cracking, reforming, hydrocracking, and denitrogenation as well as continuous separation or adsorption processes wherein a mass of siliceous particle-form solid is continuously passed over or brought into contact with a surface capable of erosion, generally of plastic or metal construction.

The method of the invention is of particular advantage in systems involving a repeated cycle of catalytic conversion and regeneration steps in which the catalyst is maintained in continuous movement throughout the system. Illustrative of such operation is the commercial catalytic process used for cracking petroleum hydrocarbons. The method of this invention will accordingly be described with reference to a catalytic cracking operation without necessarily being limited thereto and with the realization that the method is also applicable, not necessarily with equivalent results, in other conversion, separation or adsorption processes as indicated hereinabove.

In hydrocarbon cracking units of the moving bed type, there are generally employed natural or synthetic siliceous catalyst masses made up of small particles ranging in diameter from approximately 500 microns to ¼ inch. These particles vary in shape and may be in the form of pellet, extrudates, beads, or irregularly shaped pieces. Cracking units may differ somewhat in arrangement of the various elements comprising the same. They all, however, include a reactor in which catalytic conversion of the hydrocarbon feed takes place and a regenerator wherein the catalyst particles after use in hydrocarbon conversion for a specified interval of time undergo regeneration in oxygen-containing atmosphere at an elevated temperature to remove the carbonaceous deposit commonly referred to as "coke" therefrom. Also included are catalyst transfer equipment of mechanical or gas lift types and suitable feed and product recovery facilities.

In operation of the cracking units, active catalyst from the regenerator is continuously supplied to the upper portion of the conversion zone and gravitates downwardly therethrough while in contact with the hydrocarbon feed which is also continuously supplied to the reactor. The spent catalyst leaving the reactor is stripped of any remaining reaction products and is then passed to the regenerator for reactivation by contact with an oxygen-containing gas. In some units, the regenerator or kiln is so positioned below the reactor that the stripped catalyst gravitates downwardly into the regeneration zone while in other types of units the catalyst is lifted mechanically to the regenerator. In any event, the regenerated catalyst is returned to the conversion zone generally by way of an intermediate storage vessel from which the catalyst gravitates to the reactor. In some units, transfer of the reactivated catalyst to the storage vessel is made via an air lift while in other units a bucket elevator is employed to transfer the catalyst.

In operation of the foregoing units, a certain amount of undesirable erosion of the equipment has been experienced due to the impact and movement of the hard siliceous catalyst particles on the surfaces of the equipment. Erosion has been particularly prevalent in the bottom of the reactor and in the catalyst piping to the kiln where a rubbing type of erosion is encountered. As will be realized, erosion of the metal surfaces in such instances is not only undesirable in that undue wear and deterioration of the equipment is experienced but also the metal eroded from the equipment serves to bring about metal poisoning of the catalyst, lowering overall operating efficiency of the unit and requiring replacement of the catalyst at a date earlier than that obtainable in the absence of such erosion. It is estimated that erosion of the above type in a typical compact moving bed catalytic cracking unit having a 15,000 barrel capacity and employing a synthetic silica-alumina gel catalyst may account for an annual loss of up to $50,000 per unit. As will accordingly be evident, the problem of erosion in such moving bed units is a very real and serious one imposing a considerable economic burden on the overall operation.

It is a major object of the present invention to provide a method for overcoming the aforesaid problem.

In accordance with the present invention, the above and other objects which will be apparent to those skilled in the art are realized. In one embodiment, the instant invention comprises a method for reducing erosion in a moving bed operation employing a refractory particle-form solid by admixing with such solid a small amount of barytes ore having a weight mean particle diameter of less than 30 microns, and preferably between about 0.5 and about 20 microns.

In another embodiment, the invention provides an improvement in a process utilizing refractory particles in the form of a moving bed in which such particles by reason of their impact and continuous movement through a confined zone give rise to erosion of the surfaces defining such zone, which improvement involves intimately admixing with the particles between about 0.05 and about 5 weight percent of barytes ore having a weight mean particle diameter of less than about 30 microns.

Contact between the particulate solid and barytes may take place either before introduction of such material into the moving bed system or the addition of barytes may be made separately into a moving bed system into which the particulate solid has previously been introduced. It has been established that the particle size of the barytes brought into contact with the particulate solid in any case is an important feature, critical to the success of the present method. Thus, it has been discovered that the particle size of the barytes admixed with the contact material utilized herein should necessarily be characterized by a weight mean particle diameter of less than 30 microns and preferably between about 0.5 and about 20 microns. Barytes having a particle diameter in excess of about 30 microns failed to give the desired reduction in erosion experienced with addition of barytes having a particle size within the aforementioned range. The critical effect of particle size of barytes on the extent of reduction in erosion is apparent from the figure attached hereto in which the erosion rate of metal expressed as milligrams per hour is plotted against the weight mean particle diameter of barytes added in an amount corresponding to about 0.5 weight percent based on the weight of a quantity of siliceous cracking catalyst moving over the surface of said metal. Preferably, the barytes is employed in the form of a powder having a weight mean particle diameter of 0.5 to 20 microns. Particles having a weight mean particle diameter of less than about 0.5 micron, while feasible, present difficulties in handling. Also, the preparation of such extremely finely divided material of less than 0.5 micron weight mean particle diameter is generally more expensive involving much more extensive grinding than that required for material having a weight mean particle diameter of greater than 0.5 micron but less than 30 microns.

The quantity of barytes mixed with the particulate contact material is small compared to the total amount of such contact material and generally within the approximate range of 0.05 to 5 percent by weight based on the weight of the contact material.

Representative of the particle-form contact materials capable of having the erosion producing characteristics reduced as a result of the method described herein are siliceous particulate solids including synthetic cracking catalysts containing a major proportion of silica and which generally contain minor proportions of at least one oxide of metals of Groups IIA, IIIB, and IVA of the Periodic Table such as aluminum, zirconium, magnesium and titanium or ternary combinations such as silica-alumina-magnesia, silica-alumina-zirconia, etc. Also, contact materials may be derived from natural and treated clays of the bentonite, halloysite and kaolinite types. Typical of the aforesaid materials is a synthetic catalytic cracking composite containing 70 to 90 weight percent silica and 10 to 30 weight percent alumina and acid treated clays containing approximately equal amounts of silica and alumina. Mixtures of the synthetic and natural contact materials may also be readily treated by the method of the present invention. Also, the above contact solids may have associated therewith various other metals and metal compounds such as molybdenum oxide, cobalt oxide, nickel, tungsten sulfide and the like. The particles of contact material may be of any desired shape such as rods, beads, pellets or casted or extruded particles of various shapes including irregularly shaped particles.

The barytes ore used herein chemically is barium sulfate. It is characterized by a rhombic crystalline structure, a density of about 4.5 grams/cc. and a melting point of approximately 1580° C. It is also known as baryte or heavy spar.

In many operations, it is desirable to contact the siliceous particles with barytes before charging the same to the processing units in which they are to be employed. If desired, further amounts of barytes may be added to the circulating particles as the unit is in operation. Barytes may be contacted with the siliceous particles either in the form of a dry powder or as a slurry or dispersion in the liquid feed stock or other suitable liquid vehicle.

As indicated hereinabove, the method of this invention is particularly useful in catalytic cracking operations of the moving bed type. As is well known, in such processes, gas oils boiling within the range of 450° F. to 750° F. are subjected to temperatures in the order of 800° F. and higher, in the presence of a cracking catalyst, whereby the hydrocarbon vapors are converted into lighter more valuable products including gasoline. During the conversion, carbonaceous deposits form on the catalyst which impair its efficiency. The cracking process therefore generally entails a treating or reaction zone wherein conversion of the hydrocarbon occurs and a regeneration zone wherein the carbonaceous deposits are removed or burned from the catalyst in the presence of oxygen-containing gas and at an elevated temperature of the order of 900° F. to 1200° F., the catalyst being thus reactivated. In carrying out the cracking process, the catalyst continuously moves as an endless stream in and out of the reaction and regeneration zones. In cycling or circulating through the system, the catalyst is continuously contacted with the surfaces of the reactor, regenerator and associated catalyst conveying equipment causing erosion of the same. With such operations, it has been found that addition of barytes to the catalyst particles prior to introducing the latter into the unit serves to bring about a very substantial reduction in the erosion normally encountered in such unit. Additional small quantities of barytes may be made continuously or periodically to the moving catalyst bed to assist in maintaining erosion at a minimum. The total amount of barytes so added generally does not exceed about 5 weight percent of the catalyst.

Barytes may be admixed with the siliceous catalyst either in the fresh or regenerated state being circulated in the cracking unit in any convenient manner. With units in which the feed is introduced to the conversion zone in the liquid or mixed liquid-vapor form, a preferred practice is to introduce the barytes into the feed stream passing to the reaction zone. With vapor feed units, barytes is feasibly added to the catalyst at any point after the catalyst leaves the regenerator and before it has been appreciably deactivated by contact with feed in the reaction zone. It is preferred to bring the catalyst into contact with the barytes before substantial amounts of coke are deposited on the catalyst. Barytes may, if desired, be supplied to the circulating catalyst in the conversion unit in the dry condition as a powder having a weight mean particle diameter of less than 30 microns or in the form of friable particles which upon circulation in the unit and contact with the catalyst particles therein undergo ready disintegration to powder of such specified critical particle size. The barytes may alternatively be introduced into the unit as a dispersion in an aqueous or a hydrocarbon vehicle, which dispersion may be introduced at a suitable rate into the feed stream or sprayed or otherwise distributed onto the catalyst particles. Dry injection of the barytes powder may also readily be made into the catalyst conveying system of the unit, for example, into the air lift or into the elevator of non-air lift units. Injection of the dry barytes powder at the level of the air inlets to the kiln is also feasible. By injecting into the middle of the kiln, the powdered barytes generally has to pass through several feet of hot catalyst and experience has demonstrated that this is highly desirable since the powder readily adheres to the hot catalyst particles.

The following examples will serve to illustrate the method of this invention without limiting the same:

*Example 1*

A synthetic silica-alumina gel cracking catalyst containing about 90 weight percent $SiO_2$ and about 10 weight percent $Al_2O_3$ in the form of beads about 1/8" in diameter was rolled for approximately 5 minutes with an excess of barytes powder having a weight mean particle diameter in the range of 11 to 13 microns and then screened to remove the excess powder. About 0.5 weight percent barytes based on the weight of the catalyst was retained on the beads.

The catalyst particles were then subjected to an erosion test which involves rotating an auger with 5-inch stainless steel blades at a speed of 160 r.p.m. in a bed of approximately 7000 cc. of the catalyst maintained at a temperature of 1100° F. The rate of weight loss of the blades over a specified interval of time measures the erosiveness of the catalyst.

The results of such test with the foregoing barytes treated catalyst, together with those for a sample of the untreated catalyst as well as the catalyst which has been treated in a manner similar to that described above but with finely divided alumina instead of barytes are shown below:

| Catalyst | Length of Run, Hrs. | Erosion Rate, mg. lost/hr. |
|---|---|---|
| Untreated | 22 | 132 |
| With Barytes (Example 1) | 22 | 0 |
| With Alumina | 5 | 160 |

It will be evident from the above data that the catalyst with barytes effected a very substantial reduction in erosion as compared with the untreated catalyst. It will further be evident such reduction in erosion was specific for barytes and not merely attributable to the presence of a finely divided solid since when powdered alumina was employed even for a comparatively short time, the extent of erosion increased very substantially.

*Example 2*

A cracking catalyst consisting of a mixture of about 75 percent of a synthetic silica-alumina gel composite in the form of beads about ⅛″ in diameter and containing about 52 weight percent silica and about 48 percent alumina and 25 percent of a natural clay containing approximately equal percentages of silica and alumina was mixed with an excess of powdered barytes having a weight mean particle diameter of 11 to 15 microns. The excess ore was removed from the catalyst by gentle screening. Approximately 1 percent by weight barytes was retained on the catalyst particles.

The treated catalyst was then run in the above described auger erosion test together with a sample of the untreated catalyst. The results obtained are shown below:

| Catalyst | Length of Run, Hrs. | Erosion Rate, mg. lost/hr. |
| --- | --- | --- |
| Untreated | 22 | 155 |
| With Barytes (Example 2) | 142 | 0 |

It will be seen from the above data that even after 142 hours with the barytes treated catalyst, no erosion was experienced, while after 22 hours with the untreated catalyst erosion at the rate of 155 mg./hr. was encountered.

The following examples will serve to illustrate the criticality of particle size of the barytes powder admixed with the siliceous particles.

*Examples 3–4*

A synthetic silica-alumina gel cracking catalyst containing about 60 weight percent silica and about 40 weight percent alumina in the form of beads about ⅛″ in diameter was mixed with an excess of barytes powder having a weight mean particle diameter of 11 to 13 microns and then screened to remove the excess powder. About 0.5 weight percent barytes based on the weight of the catalyst was retained on the beads.

Another sample of the above catalyst was mixed in similar fashion with barytes powder having a weight mean particle diameter of about 49 microns.

Each of the above treated catalyst samples, together with the untreated catalyst were run for 24 hours in the above described auger erosion test. The results obtained are shown below:

| Catalyst | Wt. Mean Particle Diameter of Added Barytes (microns) | Erosion Rate, mg. lost/hr. |
| --- | --- | --- |
| Silica-Alumina | | 155 |
| Do | 11–13 | 0 |
| Do | 49 | 114 |

It will be evident from the above data that the larger particle size barytes ore was much less effective in reducing erosion than that of the smaller 11–13 micron material. It is contemplated that for use in the method of the invention the weight mean particle diameter of the barytes ore utilized should be less than about 30 microns.

It will be understood that the above description is merely illustrative of preferred embodiments of the invention of which many variations may be made by those skilled in the art within the scope of the following claims without departing from the spirit thereof.

We claim:

1. In a process utilizing refractory particles in the form of a moving bed wherein said particles by reason of their impact on and continuous movement through a confined zone give rise to erosion of the surfaces defining said zone, the improvement which comprises admixing with said particles between about 0.05 and about 5 weight percent of barytes ore having a weight mean particle diameter of less than 30 microns whereby a reduction in said erosion is effected.

2. A method for reducing erosion attributable to passage of a moving bed of refractory particles through a confined zone which comprises admixing with said particles a minor proportion of barytes ore having a weight mean particle diameter of less than about 30 microns.

3. A method for reducing erosion attributable to passage of a moving bed of siliceous particle-form contact material through a confined zone which comprises admixing with said contact material between about 0.05 and about 5 weight percent of barytes ore having a weight mean particle diameter of between about 0.5 and about 20 microns.

4. In a process for the catalytic cracking of a hydrocarbon charge wherein said charge is contacted in a reaction zone of a cracking unit, under cracking conditions, with a moving bed of siliceous cracking catalyst particles and in which cracked products and deactivated catalyst are continuously withdrawn from said reaction zone and said deactivated catalyst is continuously conducted through a regeneration zone and thereafter returned to said conversion zone, the improvement which comprises reducing erosion in said unit due to the aforesaid movement of said particles by intimately admixing with the catalyst a minor proportion of barytes ore characterized by a weight mean particle diameter of less than about 30 microns.

5. The process of claim 4 wherein the improvement comprises intimately admixing with the catalyst prior to introduction thereof to the unit between about 0.05 and about 5 percent of the barytes ore.

6. The process of claim 4 wherein the improvement comprises intimately admixing with the catalyst, barytes ore introduced into the unit as a dispersion in said charge.

7. The process of claim 4 wherein the improvement comprises intimately admixing with the catalyst, barytes ore introduced into the unit as a separate dry stream.

8. The process of claim 4 wherein the catalyst is a hard synthetic silica-alumina gel composite.

9. A method for reducing erosion attributable to circulation of a moving bed of solid catalyst particles through a catalytic conversion unit which comprises, admixing with said particles, barytes, in the form of friable pieces, which, upon circulation in said unit and contact with the catalyst circulated therein, undergoes ready disintegration to powder of less than about 30 microns weight mean particle diameter.

References Cited in the file of this patent
UNITED STATES PATENTS
3,030,300   Flanders et al. _____ Apr. 17, 1962

OTHER REFERENCES
"Dictionary of Applied Chemistry," Thorpe, vol. 1, page 556 (1921).